United States Patent

[11] 3,570,709

| | | |
|---|---|---|
| [72] | Inventor | Horace Robins<br>Birmingham, England |
| [21] | Appl. No. | 835,978 |
| [22] | Filed | June 24, 1969 |
| [45] | Patented | Mar. 16, 1971 |
| [73] | Assignee | Joseph Lucas (Industries) Limited<br>Birmingham, England |
| [32] | Priority | July 15, 1968 |
| [33] | | Great Britain |
| [31] | | 33621/68 |

[54] DISPENSING APPARATUS
3 Claims, 4 Drawing Figs.

[52] U.S. Cl.................................................. 221/156
[51] Int. Cl.................................................. B23q 7/12
[50] Field of Search.......................................... 221/156,
171, 173; 214/1, 1 (C)

[56] References Cited
UNITED STATES PATENTS
1,525,412  2/1925  Paranteau .................... 214/1
2,819,456  1/1958  McIlvin ........................ 221/156

FOREIGN PATENTS
517,821  2/1931  Germany...................... 221/173
733,303  7/1955  Great Britain................ 221/173

*Primary Examiner*—Samuel F. Coleman
*Attorney*—Holman, Glascock, Downing & Seebold ABSTRACT: Apparatus for dispensing a predetermined number of elongated generally planar components simultaneously in a desired orientation from a hopper containing a plurality of the components orientated randomly, the apparatus including a flat base, and a hopper for receiving a plurality of randomly orientated components. The hopper is positioned above the base and includes a number of holes equal to the number of components to be dispensed in one operation. Components are dispensed through the holes onto the base, and a wiper movable longitudinally on the base towards and away from a receiving channel parallel with the wiper. Components delivered through the holes are supported by the base so as to lie in a common plane, and are engaged by the wiper during movement of the wiper towards the receiving channel so that the movement of the wiper causes the components to become aligned with one another along the edge of the wiper. The wiper delivers the components over the edge of the preceding channel so as to stand edge on, parallel with one another along the channel.

PATENTED MAR 16 1971

INVENTOR
Horace Robins
BY Holman, Glascock,
Downing & Seebold
ATTORNEYS

DISPENSING APPARATUS

This invention relates to apparatus for dispensing a predetermined number of elongated generally planar components simultaneously in a desired orientation from a hopper containing a plurality of the components orientated randomly.

Apparatus according to the invention includes a flat base, a hopper for receiving a plurality of randomly orientated, elongated, generally planar components, the hopper being positioned above the base and having a plurality of holes in one wall thereof equal in number to the number of components to be dispensed in one operation, and through which components can be delivered singly onto the base, a receiver channel extending transversely with respect to the base and into which components are to be dispensed, and a wiper including a generally straight edge extending transversely relative to the base generally parallel with said channel, the wiper being movable generally longitudinally relative to the base in wiping contact therewith between a first position to the rear of the region of the base onto which components are delivered from the hopper and a second position adjacent said channel in the receiver, and the arrangement being such that a predetermined number of generally planar elongated components delivered through said holes are supported by said base so as to lie in a common plane, are engaged by said edge of the wiper during movement of the wiper from said first position to said second position so that said movement of the wiper causes the components to become aligned with one another along said edge and are delivered over the edge of said channel by the wiper so as to stand edge on, parallel with one another along said channel.

Figure 1:
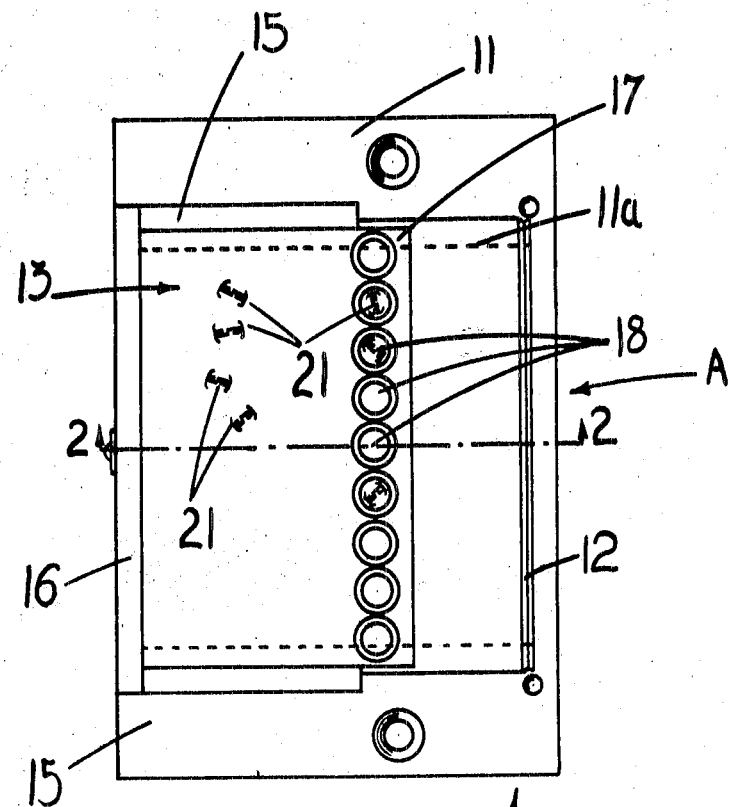
FIG. 1 is a plan view of dispensing apparatus according to one example of the invention.
Figure 2:
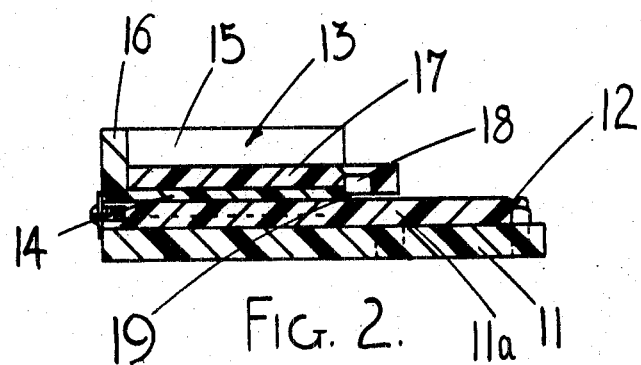
FIG. 2 is a sectional view on the line 2–2 in FIG. 1.
Figure 3:
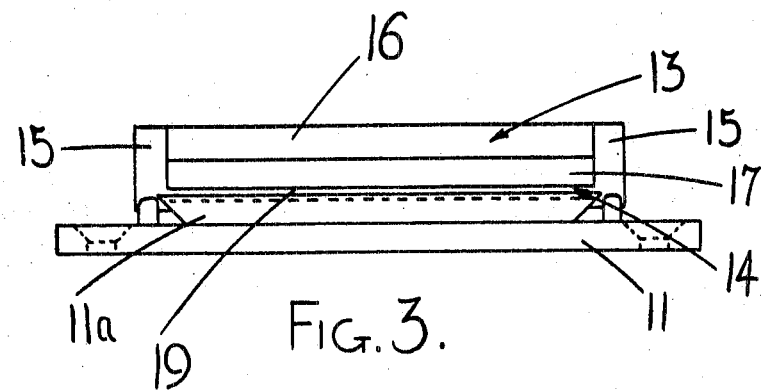
FIG. 3 is a view in the direction of arrow A in FIG. 1.
Figure 4:
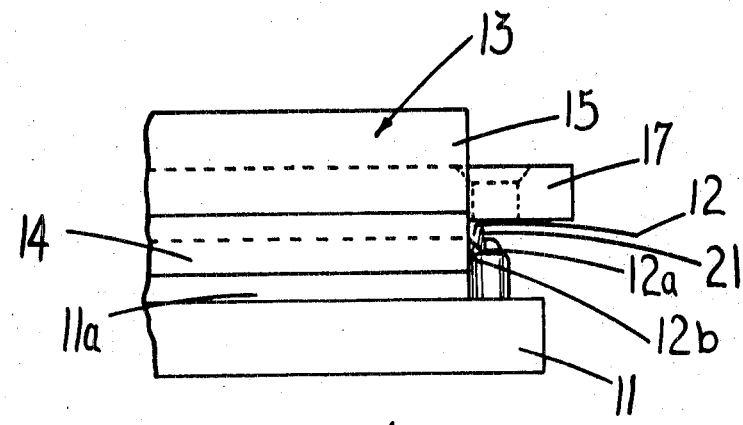
FIG. 4 is an enlarged view in the direction of arrow B in FIG. 1.

Referring to the drawing, the dispensing apparatus comprises a base 11 including a receiver plate 11a. The plate 11a is formed with a transversely extending groove or channel 12 at one end thereof, the groove 12 including a substantially vertical face 12a adjacent the end of the plate 11a, and an inclined face 12b remote from the end of the plate 11a. Slidably mounted on the base 11 for movement towards and away from the groove 12 is a component tray 13. The component tray 13 comprises a plate 14 in facial contact with the base 11 and having upstanding therefrom a pair of sidewalls 15 and an integral rear wall 16. The sides of the plate 11a are undercut, and the plate 14 is formed with a longitudinal channel of dovetail cross section, within which the plate 11a is received. The sides of the plate 11a and the mating sides of the channel in the plate 14 constitute guide means, which guide the component tray for longitudinal sliding movement relative to the base 11 and the plate 11 a towards and away from the groove 12 and which retain the tray 13 relative to the base 11 in a vertical direction. Positioned within the component tray and movable therewith is a plate 17 which at its forward edge overlies the edge of the plate 14. The portion of the plate 17 which projects beyond the forward edge of the plate 14 is formed with a plurality of holes 18 which are aligned in a transversely extending row. The forward edge of the plate 14 extends parallel with the groove 12 and constitutes a wiping edge 19 during movement of the component tray relative to the base 11.

A large number of dumbbell connectors 21 (FIG. 1) stamped from thin sheets of metal are housed in the component tray 13 on top of the plate 17. The dumbbell connectors are used to form connections on the substrate of a printed circuit, and in order to position them in the correct place on the substrate of the printed circuit a mask having slots therein is positioned on the substrate and the connectors are dropped into the slots in the mask. The dumbbell connectors are relatively small, and are extremely fragile and so handling and orientation of the connectors in readiness for insertion into the slots in the mask, by an operator, presents somewhat of a problem.

In order to position the desired number of connectors in readiness for insertion into the slots in a mask, the component tray 13 is first moved relative to the base 11 to a first position wherein it is remote from the groove 12. The number of holes 18 in the plate 17 is equal in number to the number of connectors required for one mask. The operator slides one of connectors 21 from the randomly orientated mass of connectors in the component tray 13, into each of the holes 18. The holes 18 are of sufficient dimensions to let a single connector 21 drop therethrough onto the plate 11a, and so when a connector 21 has been dropped through each of the holes 18 then the desired number of connectors are positioned on the plate 11a adjacent the edge 19 of the plate 14. The connectors 21 on the plate 11a are still angularly orientated randomly, but since the plate 11a is flat, and the connectors 21 are planar, then all of the connectors lie in the same plane. The operator now moves the component tray 13 relative to the base 11, towards the groove 12. During movement of the component tray 13 the edge 19 of the plate 14 thereof engages the connectors 21 on the base 11, and pushes them towards the groove 12. The connectors 21 have rounded ends, and are relatively narrow in relation to their length, and so as they are pushed towards the groove 12 they become aligned along the edge 19. Thus at this stage the connectors 21 on the plate 11a are both in the same plane, and are aligned with one another and with the edge 19.

As the edge 19 of the plate 14 of the tray 13 approaches the groove 12, the connectors 21 drop into the groove 12. The width of the face 12b of the groove 12 is slightly less than the width of the wider end portions of the connectors 21, and so the connectors 21 project by a small amount above the level of the surface of the plate 11a. Thus further movement of the tray 13 causes the edge 19 of the plate 14 to push the connectors upright against the wall 12a of the groove 12. The component tray 13 is then moved back to its original position in readiness for a further operation, leaving the desired number of connectors 21 aligned with one another, in the same plane as one another, and standing on edge, projecting by a small amount from the groove 12. Thus the operator can readily pick up the individual connectors from the groove 12, using a pair of tweezers, or a similar tool, and transfer the connectors from the groove 12 into the slots in the mask.

It will be appreciated that the plate 17 and the plate 14 could, if desired, be integral with one another.

It will be appreciated that it is desirable to manufacture the apparatus described above in a material the color of which contrasts with the color of the components, so that the components are easily seen.

I claim:

1. Apparatus for dispensing planar components including, a flat base, a hopper for receiving a plurality of randomly orientated, elongated, generally planar components, the hopper being positioned above the base and having a plurality of holes in one wall thereof equal in number to the number of components to be dispensed in one operation, and through which components can be delivered singly onto the base, a receiver channel extending transversely with respect to the base and into which components are to be dispensed, and a wiper including a generally straight edge extending transversely relative to the base generally parallel with said channel, the wiper being movable generally longitudinally relative to the base in wiping contact therewith between a first position to the rear of the region of the base onto which components are delivered from the hopper and a second position adjacent said channel in the receiver, and the arrangement being such that a predetermined number of generally planar elongated components delivered through said holes are supported by said base so as to lie in a common plane, are engaged by said edge of the wiper during movement of the wiper from said first position to said second position so that said movement of the wiper causes the components to become aligned with one another along said edge and are delivered over the edge of said channel by the wiper so as to stand edge on, parallel with one another along said channel.

2. Apparatus as claimed in claim 1 wherein said hopper is slidable relative to said base towards and away from said channel, said wiper being defined by part of the hopper.

3. Apparatus as claimed in claim 1 wherein said holes in one wall of the hopper are arranged in a row generally parallel with said wiper.